Jan. 4, 1938.   A. P. FERGUESON   2,104,156
TIRE COVER
Filed Nov. 3, 1930   2 Sheets-Sheet 2
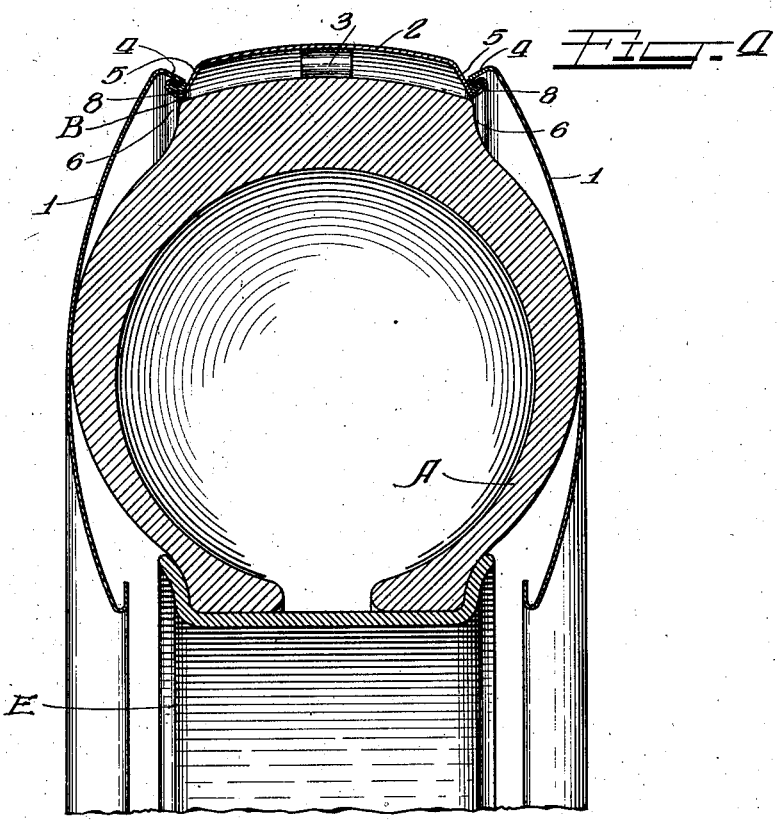
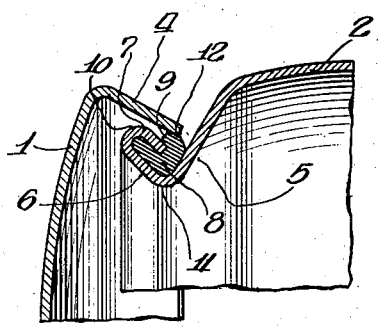
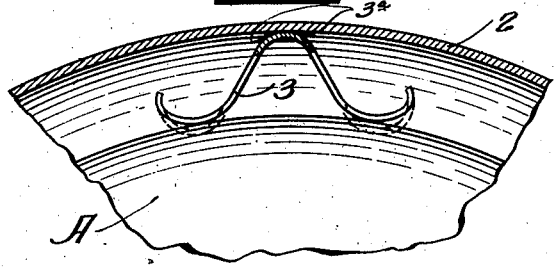
Inventor
Arthur P. Fergueson.
by Charles W. Wills. Atty.

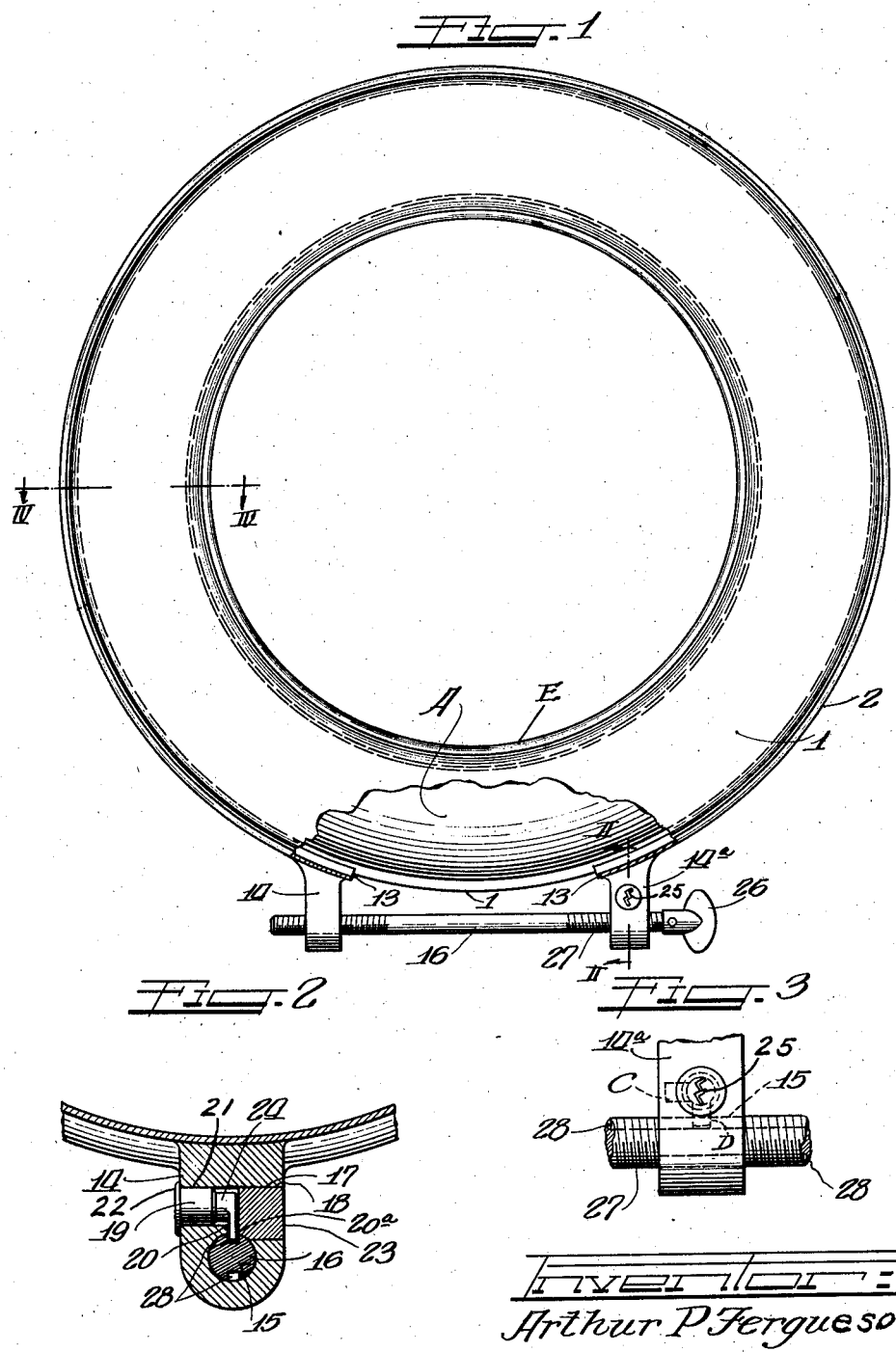

UNITED STATES PATENT OFFICE 2,104,156

TIRE COVER

Arthur P. Fergueson, Detroit, Mich., assignor to Lyon Cover Company, Detroit, Mich., a corporation of Michigan Application November 3, 1930, Serial No. 492,970

23 Claims. (Cl. 150—54)

This invention has to do with tire covers, more particularly of the metallic type embodying a side plate adapted to engage the side wall of a tire and a peripheral member adapted to at least partially encircle the tire and hold the side plate and itself thereon.

Fabric and the like tire covers have proven unsatisfactory since they are not durable, become wrinkled and unsightly after a short period of use, and are easily injured and stolen. It has been proposed in the past to substitute for fabric and the like covers, devices of this character made of metal, but thus far such attempts have been attended by little success, due to the fact that the construction has been cumbersome, heavy, unsightly, and complicated, necessarily involving a high cost of manufacture. Moreover, such devices of this character which have been made of metal present the additional objectionable feature of rattling.

It is accordingly one of the principal objects of the invention to provide a metallic tire cover embodying few parts, which adds greatly to the beauty of the vehicle in connection with which it is used, may be attached and detached readily, is of light construction, and embodies instrumentalities whereby rattling of the parts is inhibited.

In carrying out the invention into practice, one or more substantially annular plates are applied to the opposite side walls of a tire. An expansible and contractible ring or partial ring is disposed about the outer periphery of the tire and is provided with upturned flanges cooperating with adjacent flanges on the plates to cam the latter into tight engagement with the ring and tire, suitable anti-rattling and centering instrumentalities being disposed between the ring and the tread of the tire and between the flanges. In addition, suitable expanding and contracting means is employed in connection with the expansible and contractible member, and locking means is included therein to positively maintain said member in the desired position of adjustment.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view showing the tire cover embodying the invention applied to a spare tire, a portion of the illustration being broken away to illustrate certain details.

Figure 2 is an enlarged fragmentary sectional view taken approximately in the plane indicated by the line II—II in Figure 1, and showing the locking instrumentalities, one of the said instrumentalities being shown in elevation.

Figure 3 is an enlarged fragmentary elevational view taken at right angles to the view shown in Figure 2.

Figure 4 is an enlarged sectional view taken approximately in the plane indicated by the line IV—IV in Figure 1.

Figure 5 is an enlarged fragmentary sectional view showing certain details of a portion of Figure 4.

Figure 6 is an enlarged fragmentary sectional view showing certain centering and anti-rattling means in detail.

Referring now more particularly to the drawings, wherein the same part is indicated by the same reference character in each case, the tire cover embodying the invention consists generally of a pair of side plates 1 and an outer ring 2, the plates being engageable with the side walls of the tire A and the outer ring 2 having means for engagement with the tread of the tire. Each plate 1 is preferably inwardly concave and is preferably made of metal. The outer ring 2 is likewise preferably made of metal and is moreover preferably somewhat concaved inwardly.

A circumferential series of spring elements 3 is located interiorly of the ring 2 and is preferably secured thereto as by spot welding at 3a. It is thus apparent that the spring elements 3 serve not only as anti-rattling means, but also to center the ring 2 on the tire A.

The side plates 1 are preferably identical with each other, and the means for maintaining a connection between the outer ring 2 and each side plate is substantially the same, so that the following description is limited to the connection between one of the plates and the outer ring.

The side plate 1 is provided with an outer peripheral edge portion 4 which extends inwardly and is laterally inclined toward the axis of the plate. The outer ring 2 has substantially L-shaped side flanges 5 inclined inwardly and laterally, the outermost portions 6 of said flanges having return bends 7 in which strips 8 of resilient material such as rubber are securely held. A portion 9 of each strip 8 projects beyond the bend 7 and is engageable with the extremity of the edge portion 4 of each plate 1, thus serving to prevent metal contact and rattling between the members 1 and 2.

It will be apparent that upon expansion of the member 2, the portion 9 of the strip 8 will tend to ride up the interior surface of the edge portion 4, to thereby cam the plates 1 toward the ring member 2. It will be noted that when the parts are interlocked as illustrated in Figures 4 and 5, the uppermost portion 10 of the bend 7 extends radially outward beyond the innermost portion 12 of the edge portion 4 of the plate 1, thereby inhibiting unauthorized removal of the plate 1. The parts are so constructed that the radial distance between the outermost portion 10 of the bend 7 and the innermost portion 11 of the flange 5 is not in excess of the radial distance between the innermost portion 12 of the edge portion 4 of the plate 1 and the adjacent portion B of the tread of the tire A. Thus, when the ring 2 is contracted so that its portion 11 engages the tread of the tire at B, the plate 1 may be moved axially out of engagement with the ring 2.

The spring elements 3 are so constructed as to center the ring 2 about the tire A at all times, even when the cover is locked on the tire in the position shown in Figure 4. It will be observed from Figure 6 that the spring elements 3 are under pressure when the cover is in proper tire protecting position with the ring 2 in expanded condition. Obviously, before expansion of the ring 2 to interlock the same with the side plate or plates, the spring elements 3 are under still further pressure between the ring 2 and the tire tread, and said elements exert an expansive force on the ring when it is on the tire.

Spot welded or otherwise secured to the ends 13 of the expansible and contractible ring 2 are bosses or brackets 14 and 14a having threaded openings 15 to receive the right and left hand threads of a turn buckle 16.

The bracket 14a is provided with means for locking the turn buckle 16 in any desired position of adjustment. To this end the bracket 14a has a transverse opening 17 of sufficient size at one end 18 to permit the insertion of a lock cylinder 19 provided with a locking extension 20. The opposite end 21 of the opening 17 is of a diameter to accommodate the cylinder 19, to which the flange 22 may be threaded or otherwise fastened in place. After the cylinder 19 is in position, the end 18 of the opening 17 is plugged at 23, so that the plug 23 permanently prevents separation of the cylinder 19 from the bracket 14.

The wall of the opening 17 intermediate its ends is provided with a recess 20a transverse to the length of the openings 17 and communicating therewith, said recess also communicating with the threaded opening 15. The locking extension 20 is adapted to move in said recess and projects into the threaded opening 15 as shown in Figures 2 and 3. The extension is preferably formed on an element 24, and suitable tumbler instrumentalities, not shown, may be employed in connection therewith for operation by the proper key upon insertion of the latter into the opening 25 in the lock cylinder 19. The turn buckle element 16 is provided with a thumb grip 26 for manipulating purposes, and the threaded portion 27 adjacent said thumb grip is provided with longitudinal recesses or grooves 28, any suitable number of such grooves being provided in accordance with the degree of adjustment desired. The grooves 28 are adapted selectively to register with the recess 20a to receive the extension 20 of the locking instrumentalities, whereby unauthorized rotation of the element 16 is prevented. The task of alining each groove 28 with the recess 20a is a simple one since it is necessary merely to rotate the element 16 so that one of said grooves is uppermost. However, if desired, a line or notch can be made in the outer right hand face of the bracket 14a, as viewed in Figure 1, to indicate the position to which one of the grooves 28 must be brought in order to be in register with the recess 20a.

Bearing the foregoing in mind, it will be apparent that the cover may be applied to the tire by first placing the ring member substantially in the position shown in Figure 4, then contracting the same by means of the turn buckle 16 or equivalent device and associated brackets 14 and 14a until the outer diameter of each flange 6 is equal to or slightly less than the interior diameter of the inturned edges 4 at 12. One of the plates 1 may then be placed horizontally on a suitable support and the tire A with the ring 2 thereon, placed over the plate until the flange 6 overlaps the inturned edge 4 of the plate. The second plate 1 is then placed over the tire A with its edge 4 in overlapping relation to the corresponding flange 6 of the ring 2. With the parts thus arranged, the turn buckle 16 is rotated in a direction to separate the brackets 14 and 14a, thereby forcing the rubber strips 8 into tight engagement with the edges 4 of the plates 1, and camming the edges 4 toward each other. After the parts are adequately tightened, a key may be inserted in the key opening 25 to shift the locking element or extension 20 from the unlocked position shown in Figure 3 at C to its locking position at D, thereby effectively locking the tire cover on the tire.

The invention has been disclosed as employed in connection with a tire which is mounted on a rim E, but it is considered well within the province of the invention to employ the same in connection with any spare tire regardless of the construction of wheel or rim upon which it is mounted.

It will be clear from the foregoing that the tire cover embodying this invention may be applied to and removed from a tire by a single person unaided, that it presents an extremely neat appearance which enhances the appearance of the vehicle in connection with which it is used, is of simple construction involving a minimum of parts, will serve to adequately protect the tire, and is not only theft proof but prevents theft of the tire as well.

The turnbuckle 16 is preferably made of sufficiently hard metal to withstand attempts to damage or break the same. However, if desired, the portion of the element 16 between the brackets 14 and 14a could be housed in a collapsible and expansible casing or otherwise to prevent access thereto. Moreover, while as disclosed the invention embodies an outer ring whose flanges are disposed within the side plates, this arrangement is susceptible of reversal, in which event the flanges of the ring could be disposed outside of the corresponding edges of the plate 1, and the ring 2 could then be contracted by the turnbuckle 16 and associated parts in order to clamp the plates 1 tightly against the side walls of the tire A.

The form of locking instrumentalities for preventing unauthorized rotation of the element 16 may be varied so long as the form used accomplishes the desired end. For example, a spring pressed plunger could be employed in connection with the lock cylinder and tumbler means, if so desired.

I am aware that numerous details of construction may be varied through a wide range without departing from the spirit of this invention, and I, therefore, do not purpose limiting the patent granted otherwise than is necessitated by the prior art.

I claim as my invention:

1. A tire cover comprising plates engageable with the side walls of a tire, a radially expansible and contractible ring for disposition about the tire, interlocking means on said ring and plates, a device for expanding said ring to cause said means to interlock and instrumentalities for preventing undesired contraction of said ring.

2. A tire cover comprising plates engageable with the side walls of a tire, a radially expansible and contractible ring for disposition about the tire, interlocking means on said ring and plates, a device for expanding said ring to cause said means to interlock instrumentalities for preventing undesired contraction of said ring, and means for centering said ring about the tire.

3. A tire cover comprising plates engageable with the side walls of a tire, a radially expansible and contractible ring for disposition about the tire, interlocking means on said ring and plates, a device for expanding said ring to cause said means to interlock instrumentalities for preventing undesired contraction of said ring, and means for preventing rattling between said ring and said plates.

4. A tire cover comprising plates engageable with the side walls of a tire, a ring adapted for disposition about the tire, interlocking means on said ring and plates, and a device for expanding said ring to cause said means to interlock.

5. A tire cover comprising a plate engageable with the side wall of a tire, an expansible and contractible ring for disposition about the tread of the tire, said plate and ring having coengaging cam portions which interlock upon expansion of the ring portion, and means for locking the ring in expanded condition.

6. A tire cover comprising a plate engageable with the side wall of a tire, an expansible and contractible ring for disposition about the tread of the tire, said plate and ring having coengaging cam portions which interlock upon expansion of the ring portion, and means for maintaining said ring centered about tires of various sizes.

7. A tire cover comprising a plate engageable with the side wall of a tire, an expansible and contractible ring for disposition about the tread of the tire, said plate and ring having coengaging cam portions which interlock upon expansion of the ring portion, and resilient means for automatically centering said ring about a tire.

8. A tire cover comprising a plate engageable with the side wall of a tire, said plate having a peripheral flange extending inwardly short of the tread of the tire, an expansible and contractible ring adapted for disposition about the tread of the tire and having an outwardly turned flange adapted to pass between said plate flange and the tread of the tire, and engageable with the inner wall of said plate flange upon expansion of said ring, whereby to prevent unauthorized removal of the plate, resilient means included in one of said flanges and adapted to lie between said flanges to prevent rattling, and means for preventing removal of said ring from the tire, and means for centering said ring and plate about the tire.

9. A tire cover comprising plates engageable with the side walls of a tire, a radially expansible and contractible ring for disposition about the tire, interlockable means on said ring and plates, means for expanding said ring to cause the first means to interlock, and means for centering the cover about a tire.

10. A tire cover comprising plates engageable with the side walls of a tire, a radially expansible and contractible ring for disposition about the tire, interlockable means on said ring and plates, means for expanding said ring to cause the first means to interlock, and means for preventing rattling between said ring and said plates.

11. A tire cover comprising a plate engageable with a side wall of a tire and having a peripheral flange inclined toward the axis of the plate and extending away from the plate, and a radially expansible and contractible ring for disposition about the tire and engageable with the inner surface of the flange, whereby, upon movement of the ring radially toward the flange, the latter will be drawn by a cam action in the direction of the center of the tread, and the plate and ring will be interlocked.

12. A tire cover comprising plates engageable with the side walls of a tire, a radially expansible and contractible ring for disposition about the tire, interlockable means on said ring and plates, and means for expanding said ring to cause the first mentioned means to interlock, the second means including means for centering the cover about the tire.

13. In a spare tire cover, a plurality of cooperating interlockable arcuate sections for disposition over the outer side and tread portions of the tire, the tread section being radially expansible, and means for expanding the tread section radially on the tire to interlock the sections.

14. In a spare tire cover, a plurality of cooperating interlockable arcuate sections for disposition over the outer side and tread portions of the tire, the tread section being radially expansible, and means for expanding the tread section radially on the tire to interlock the sections, said sections being capable of free relative axial movement when said tread section is unexpanded.

15. A tire cover comprising a plate engageable with a side wall of a tire, a radially expansible and contractible ring for disposition about the tire, interlockable means on said ring and plate, and means for expanding said ring to cause the first mentioned means to interlock, the second means including means for centering the cover about the tire.

16. A tire cover comprising a plate engageable with a side wall of a tire, a radially expansible and contractible ring for disposition about the tire, interlockable means on said ring and plate, and means for expanding said ring to cause the first mentioned means to interlock, the second means including means for centering the cover about the tire, said plate and ring being capable of free relative axial movement when said ring is contracted.

17. A tire cover for spare tires, said cover comprising a plate for covering a side wall of the tire and having a peripheral flange inclined toward the axis of the plate and extending away from the plate, and a radially expansible and contractible split ring engageable with the inner surface of the flange, whereby, upon expansion of the ring radially toward the flange, the latter will be drawn by a cam action in the direction of the center of the tread, and the plate and ring will be interlocked.

18. A tire cover for spare tires, said cover comprising a plate for covering a side wall of the tire and having a peripheral flange inclined toward the axis of the plate and extending away from the plate, and a radially expansible and contractible split ring engageable with the inner surface of the flange, whereby, upon expansion of the ring radially toward the flange, the latter will be drawn by a cam action in the direction of the center of the tread, and the plate and ring will be interlocked, and retaining means for disposition adjacent the other side wall of the tire and having a substantially annular portion interlockable with said ring and extending when so interlocked radially inward beyond the outer periphery of the tire for preventing removal of the cover from the spare tire.

19. A tire cover for spare tires, said cover comprising a plate for covering a side wall of the tire and having a peripheral flange inclined toward the axis of the plate and extending away from the plate, and a radially expansible and contractible split ring engageable with the inner surface of the flange, whereby, upon expansion of the ring radially toward the flange, the latter will be drawn by a cam action in the direction of the center of the thread, and the plate and ring will be interlocked, and resilient means carried interiorly by said ring and arranged to be under pressure between the ring and the tire tread, said resilient means being arranged circumferentially to space and center the ring about the tire.

20. In a spare tire cover, a pair of cooperable interlockable arcuate sections for disposition over the tread and at least one side of the tire, one of said sections being radially expansible and contractible and constructed and arranged so that it may be expanded radially into interlocked relation to the other section and so that it may be contracted to release the same from said other section.

21. A tire cover comprising an inwardly contractible tire tread covering strip having relatively movable ends, and at least one annular tire side wall masking strip, said tread covering strip being substantially rigid but resilient, and interlocking means for detachably securing longitudinally extending edges of the strips together, said wall masking strip being so dimensioned that when the cover is fitted in place on an appropriately sized tire said masking strip will resist expansion of the secured edge of the said covering strip to retain it in place over the tire tread said strips being movable out of interlocked engagement by their relative radial movement.

22. A tire cover comprising a split annular one piece member of arcuate cross sectional contour, means connecting the split ends of the cover for contracting same, and relatively narrow, circumferentially positioned and spaced means carried by said cover for engaging the tire, said means normally tending to circumferentially expand the cover and clamping the cover in position when contracted, said cover being spaced from the tire and said clamping means being formed to provide a space between the tire and the cover to permit ventilation around the tire.

23. A tire cover structure comprising a solid member for covering a portion of a tire, a contractible and expansible member for covering another portion of a tire, controlled means for expanding said last member outwards into engagement with said first member to assemble said members upon a tire, said members having engaging parts proportioned to draw said members together upon the expansion of one of said members into the other.

ARTHUR P. FERGUESON.